(12) United States Patent
Lee (10) Patent No.: US 12,106,226 B2
(45) Date of Patent: *Oct. 1, 2024

(54) SYSTEM AND METHOD FOR KNOWLEDGE DISTILLATION

(71) Applicant: Samsung Display Co., Ltd., Yongin-si (KR)

(72) Inventor: Janghwan Lee, Pleasanton, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,005

(22) Filed: Jun. 7, 2023

(65) Prior Publication Data

US 2023/0316084 A1 Oct. 5, 2023

Related U.S. Application Data

(63) Continuation of application No. 16/682,815, filed on Nov. 13, 2019, now Pat. No. 11,710,045.

(Continued)

(51) Int. Cl.
  *G06N 3/04* (2023.01)
  *G06N 3/045* (2023.01)
  (Continued)

(52) U.S. Cl.
  CPC ............. *G06N 3/088* (2013.01); *G06N 3/045* (2023.01); *G06N 3/047* (2023.01)

(58) Field of Classification Search
  CPC ...... G06N 20/20; G06N 3/045; G06N 3/0454; G06N 3/0455
  See application file for complete search history.

(56) References Cited

U.S. PATENT DOCUMENTS

| 9,037,518 B2 | 5/2015 | Lakshminarayan et al. |
| 9,798,982 B2 | 10/2017 | Lin et al. |

(Continued)

FOREIGN PATENT DOCUMENTS

| CN | 105589806 A | 5/2016 |
| CN | 107391370 A | 11/2017 |

(Continued)

OTHER PUBLICATIONS

Mariani, Giovanni, et al. "Bagan: Data augmentation with balancing gan." arXiv preprint arXiv:1803.09655 (2018). (Year: 2018).*

(Continued)

*Primary Examiner* — Hal Schnee
(74) *Attorney, Agent, or Firm* — Lewis Roca Rothgerber Christie LLP (57) ABSTRACT

A system and method for classifying products. A processor generates first and second instances of a first classifier, and trains the instances based on an input dataset. A second classifier is trained based on the input, where the second classifier is configured to learn a representation of a latent space associated with the input. A first supplemental dataset is generated in the latent space, where the first supplemental dataset is an unlabeled dataset. A first prediction is generated for labeling the first supplemental dataset based on the first instance of the first classifier, and a second prediction is generated for labeling the first supplemental dataset based on the second instance of the first classifier. Labeling annotations are generated for the first supplemental dataset based on the first prediction and the second prediction. A third classifier is trained based on at least the input dataset and the annotated first supplemental dataset.

20 Claims, 7 Drawing Sheets

Related U.S. Application Data (60) Provisional application No. 62/909,053, filed on Oct. 1, 2019.

(51) Int. Cl.
  *G06N 3/047* (2023.01)
  *G06N 3/08* (2023.01)
  *G06N 3/088* (2023.01)

(56) References Cited

U.S. PATENT DOCUMENTS

| | | |
|---|---|---|
| 10,043,261 B2 | 8/2018 | Bhaskar et al. |
| 2008/0025591 A1 | 1/2008 | Bhanot |
| 2013/0097103 A1 | 4/2013 | Chari et al. |
| 2013/0198118 A1 | 8/2013 | Kowalczyk et al. |
| 2015/0278470 A1 | 10/2015 | Bakker |
| 2016/0092789 A1 | 3/2016 | Codella et al. |
| 2016/0335548 A1 | 11/2016 | Goh et al. |
| 2018/0165554 A1 | 6/2018 | Zhang |
| 2018/0275642 A1 | 9/2018 | Tajima et al. |
| 2019/0087728 A1 | 3/2019 | Agarwal et al. |
| 2019/0370384 A1 | 12/2019 | Dalek |
| 2020/0065384 A1 | 2/2020 | Costello |
| 2020/0097763 A1 | 3/2020 | Haerterich et al. |
| 2020/0143274 A1 | 5/2020 | Chitta et al. |
| 2020/0160201 A1 | 5/2020 | Katuwal et al. |
| 2020/0210808 A1 | 7/2020 | Dong |
| 2020/0226420 A1 | 7/2020 | Shaubi et al. |
| 2020/0311572 A1 | 10/2020 | Baker |

FOREIGN PATENT DOCUMENTS

| | | |
|---|---|---|
| CN | 107103332 B | 6/2018 |
| CN | 108563556 A | 9/2018 |
| EP | 3101599 A1 | 12/2016 |
| JP | 2018-160093 A | 10/2018 |
| KR | 10-1744194 | 6/2017 |
| TW | 201734955 A | 10/2017 |
| WO | 2019/017962 A1 | 1/2019 |
| WO | WO 2019/123451 A1 | 6/2019 |

OTHER PUBLICATIONS

Notice of Allowance dated Oct. 18, 2023 for U.S. Appl. No. 16/442,298 (16 pages).

Taiwanese Office Action dated Dec. 11, 2023, issued in Taiwanese Patent Application No. 109104858 (20 pages).

Japanese Office Action dated Dec. 19, 2023, issued in Japanese Patent Application No. 2020-029704 (4 pages).

Abdulhammed, Razan, et al., "Deep and Machine Learning Approaches for Anomaly-Based Intrusion Detection of Imbalanced Network Traffic," IEEE Sensors Letters, IEEE, vol. 3, No. 1, Jan. 2019, 4 pages.

Chakraborty, Debasrita, Vaasudev Narayanan, and Ashish Ghosh. "Integration of deep feature extraction and ensemble learning for outlier detection." Pattern Recognition 89 (2019): 161-171. (Year: 2019).

Guo, Ting, et al. "Discriminative sample generation for deep imbalanced learning." Twenty-Eighth International Joint Conference on Artificial Intelligence {IJCAI-19}. International Joint Conferences on Artificial Intelligence Organization, 2019. (Year: 2019).

Jorge, Javier, et al., "Empirical Evaluation of Variational Autoencoders for Data Augmentation," VISAPP 2018—International Conference on Computer Vision Theory and Applications, vol. 5, 2018, pp. 96-104.

Perez-Ortiz, Maria, et al. "Graph-based approaches for oversampling in the context of ordinal regression." IEEE Transactions on Knowledge and Data Engineering 27.5 (2014): 1233-1245. (Year: 2014).

Radosavovic, I., et al., "Data Distillation: Towards Omni-Supervised Learning," *Computer Vision and Pattern Recognition*, (2018), pp. 4119-4128, https://arxiv.org/abs/1712.04440.

Wan, Zhiqiang, et al., "Variational Autoencoder Based Synthetic Data Generation for Imbalanced Learning," IEEE Symposium Series on Computational Intelligence, IEEE, 2017, 7 pages.

Adaptive neighbor synthetic minority oversampling technique—(Year: 2016).

U.S. Office Action dated Dec. 13, 2022, issued in U.S. Appl. No. 16/442,298 (43 pages).

EPO Extended European Search Report dated Mar. 10, 2021, issued in corresponding European Patent Application No. 20198821.9 (9 pages).

EPO Extended Search Report dated Aug. 18, 2020, issued in European Patent Application No. 20155921.8 (9 pages).

U.S. Final Office Action dated Mar. 15, 2023, issued in U.S. Appl. No. 16/442,298 (44 pages).

* cited by examiner

SYSTEM AND METHOD FOR KNOWLEDGE DISTILLATION

CROSS-REFERENCE TO RELATED APPLICATION(S)

This application is a continuation of U.S. patent application Ser. No. 16/682,815, filed Nov. 13, 2019, which claims priority to and the benefit of U.S. Provisional Application No. 62/909,053, filed Oct. 1, 2019, entitled "KNOWLEDGE DISTILLATION FOR DATA INSUFFICIENCY," the entire content of each of which is incorporated herein by reference.

FIELD

One or more aspects of embodiments according to the present disclosure relate to classifiers, and more particularly to a system and method for training a machine learning (ML) classifier where the available training data is small and imbalanced.

BACKGROUND

The mobile display industry has grown rapidly in recent years. As new types of display panel modules and production methods are being deployed, surface defects have been harder to inspect using just traditional mechanisms. It would be desirable to employ artificial intelligence (AI) to automatically predict whether a manufactured display panel module is faulty or not (e.g. classified as "no good" or "good"). In fact, it would be desirable to employ AI to predict defects in other hardware products, and not just display panel modules.

An AI/ML model that can generalized well to new, previously unseen data (referred to as a "generalized ML model") would be suitable for such a task. However, generating a generalized ML model is hard when the training dataset is insufficient and highly imbalanced. Due to the nature of manufacturing dataset, insufficiency and class imbalance of dataset are unavoidable issues and it makes a challenge task to generate a generalized machine learning model.

Thus, there is a need for an improved system and method for building an AI/ML model steadily and stably from a limited amount of training data, which could be imbalanced over binary classes.

SUMMARY

Embodiments of the present disclosure are directed to a method for classifying products manufactured via a manufacturing process. A processor receives an input dataset, generates at least first and second instances of a first classifier, and trains the first and second instances of the first classifier based on the input dataset. A second classifier is also trained based on the input dataset, where the second classifier is configured to learn a representation of a latent space associated with the input dataset. The processor further generates a first supplemental dataset in the latent space, where the first supplemental dataset is an unlabeled dataset. The processor generates a first prediction for labeling the first supplemental dataset based on the first instance of the first classifier, and further generates a second prediction for labeling the first supplemental dataset based on the second instance of the first classifier. The processor generates labeling annotations for the first supplemental dataset based on the first prediction and the second prediction. The processor further trains a third classifier based on at least the input dataset and the annotated first supplemental dataset. The trained third classifier is configured to receive data for a product to be classified, to output a prediction for the product based on the received data.

In one embodiment, each of the first, second, and third classifiers is a neural network.

In one embodiment, the second classifier is a variational autoencoder.

In one embodiment, the latent space provides a compressed representation of the input dataset.

In one embodiment, the generating of the first supplemental dataset includes generating random data elements in the latent space.

In one embodiment, the generating of the labeling annotations include determining a major class based on the first prediction and the second prediction, and labeling the first supplemental dataset based on the major class.

In one embodiment, the generating of the labeling annotations include: determining a first probability of the first prediction and a second probability of the second prediction; computing an average of the first probability and the second probability; and identifying a class for the first supplemental dataset based on the computed average.

In one embodiment, the generating of the labeling annotations include: determining, based on the first prediction, a first probability of a major class and a second probability of a minor class; determining, based on the second prediction, a third probability of the major class and a fourth probability of the minor class; computing a first average of the first and third probabilities; computing a second average of the second and fourth probabilities; and labeling the first supplemental dataset based on the computed first and second averages.

In one embodiment, the method for classifying products further includes: generating a second supplemental dataset based on oversampling the latent space; and training the third classifier based on the input dataset, the annotated first supplemental dataset, and the second supplemental dataset.

Embodiments of the present disclosure are also directed to a system for classifying products manufactured via a manufacturing process. The system comprises a processor and memory, where the memory has stored therein instructions that, when executed by the processor, cause the processor to: receive an input dataset; generate at least first and second instances of a first classifier; train the first and second instances of the first classifier based on the input dataset; train a second classifier based on the input dataset, wherein the second classifier is configured to learn a representation of a latent space associated with the input dataset; generate a first supplemental dataset in the latent space, wherein the first supplemental dataset is an unlabeled dataset; generate a first prediction for labeling the first supplemental dataset based on the first instance of the first classifier; generate a second prediction for labeling the first supplemental dataset based on the second instance of the first classifier; generate labeling annotations for the first supplemental dataset based on the first prediction and the second prediction; and train a third classifier based on at least the input dataset and the annotated first supplemental dataset. The trained third classifier is configured to receive data for a product to be classified, to output a prediction for the product based on the received data.

Embodiments of the present disclosure are further directed to a system for classifying manufactured parts as good or defective. The system comprises a data collection circuit configured to collect an input dataset; and a processing circuit coupled to the data collection circuit. The processing circuit has logic for: receiving the collected input dataset; generating at least first and second instances of a first classifier; training the first and second instances of the first classifier based on the input dataset; training a second classifier based on the input dataset, wherein the second classifier is configured to learn a representation of a latent space associated with the input dataset; generating a first supplemental dataset in the latent space, wherein the first supplemental dataset is an unlabeled dataset; generating a first prediction for labeling the first supplemental dataset based on the first instance of the first classifier; generating a second prediction for labeling the first supplemental dataset based on the second instance of the first classifier; generating labeling annotations for the first supplemental dataset based on the first prediction and the second prediction; and training a third classifier based on at least the input dataset and the annotated first supplemental dataset, wherein the trained third classifier is configured to receive data for a product to be classified, to output a prediction for the product based on the received data.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for data augmentation provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

A manufacturing process, such as a mobile display manufacturing process, may acquire digital trace data during the manufacture of the mobile display product. Although a mobile display product is used as an example, a person of skill in the art should recognize that embodiments of the present disclosure may apply to manufacturing processes of other glass and non-glass products, including for example, the manufacturing of wafer and semiconductor glass.

Trace data is collected via one or more sensors that may be placed, for example, on top of a conveyer belt that carries the product during production. The sensors are configured to record any sensed activity as trace data. The sensors may be, for example, multiple temperature and pressure sensors configured to capture measurements of temperature and pressure in the manufacturing process, as a function of time. Each sensor may be sampled multiple times (e.g., every few seconds over a glass or wafer to be manufactured in a chamber).

It is desirable to analyze the trace data automatically using a classifier to predict faulty ("no good") manufactured products from not-faulty ("good") products. The classifier thus needs to be trained to assign the data samples to one of two classes—"good" and "no good." There may be, however, a significant imbalance in the training data used to train such a classifier. For example, in the manufacturing process for manufacturing electronic parts, it may be the case that the majority of the parts are acceptable, or "good," and a small minority of the parts are in some way defective, or "no good." The number of "good" parts may outnumber the number of bad parts by a factor ranging from 100 to 200. For this reason, when data is obtained during the manufacturing and testing process, most of the data may be from good devices, causing an imbalance in the training data. In addition, it is also generally hard to expect to have a sufficient dataset to train the deep learning model because of rapid product model changes. The short lifetime of a product model makes it hard to gather enough data samples. It is also generally necessary to generate a new AI/ML model for a new product model to detect faulty conditions of the new product model. Thus, it is a common challenge to generate a generalized model with a limited dataset.

Data augmentation techniques exist that may be used to artificially expand the size of the training dataset. One technique may be, for example, to generate all possible data sample cases to use as training data. Accounting for all possible cases, however, generates too big of a dataset. Also, although the samples may be expanded, they may not all be meaningful in training the model.

Another technique that is often employed for visual recognition/image classification is data distillation. Data distillation is a general method for omni-supervised learning that distills knowledge from unlabeled data by generating annotations of the unlabeled data. The annotations are generated using a model that is trained on large amounts of labeled data. The model is then retrained using the extra generated annotations. The extra unlabeled data may be generated via geometric/spatial transformations of the labeled data (e.g. flip, shift, and/or rotations). Additional information on data distillation is provided, in "Data Distillation: Towards Omni-Supervised Learning," by Ilija Radosavovic, et. al, Computer Vision and Pattern Recognition (2018), available at https://arxiv.org/abs/1712.04440, the content of which is incorporated herein by reference.

Geometric transformations that are typically used to augment the data for image classification, however, are not applicable to trace data as it is not possible to know which transformations will allow the characteristic of the input data to be maintained after the transformation is applied. Also, for defect samples, there is generally a correlation between the manufacturing task and the defect pattern generation, so it is not guaranteed to improve the quality of the classifier by applying known data augmentation techniques. Thus, traditional data augmentation techniques are not suitable for expanding defects or trace data for training purposes. Data distillation suggests the use of unlabeled dataset from Internet level of dataset, but similar data samples for a particular company's manufacturing dataset is not possible to be found on the Internet.

Given the deficiencies in the prior art, what is desired is a system and method for an omni-supervised learning approach for generating a generalized ML model that addresses the issues of data insufficiency and class imbalance in the labeled dataset. According to various embodiments, insufficiency and class imbalance of the input dataset is addressed via data augmentation using a deep generative model. Specifically, data augmentation is performed in the manifold (latent) space instead of the input data space.

Also, as one of the main issues in generating a generalized AI/ML model is insufficient dataset, this issue may be addressed by fusing more variance into the dataset by using a deep generative model data generation. In some embodiments, the augmented/supplemental data is an unlabeled dataset that is generated from the latent space using a random input. In some embodiments, the augmented data is composed of synthetic data samples obtained from latent space oversampling.

According to one embodiment, knowledge is distilled from multiple instances of a baseline machine learning model to annotate the unlabeled dataset and generate a new annotated dataset. Knowledge from the multiple instances may be distilled by feeding the unlabeled dataset to each of the multiple instances of the trained ML model. The unlabeled data may then be labeled based on the output of each of the ML model instances, using an ensemble mechanism. Knowledge distillation may thus be achieved from the less data intense models (e.g. the individual ML model instances), while generalizing the ML model to achieve better classification accuracy than traditional models alone. Once trained, the generalized ML model may be used to predict faulty parts resulting from a manufacturing process.

Figure 1:
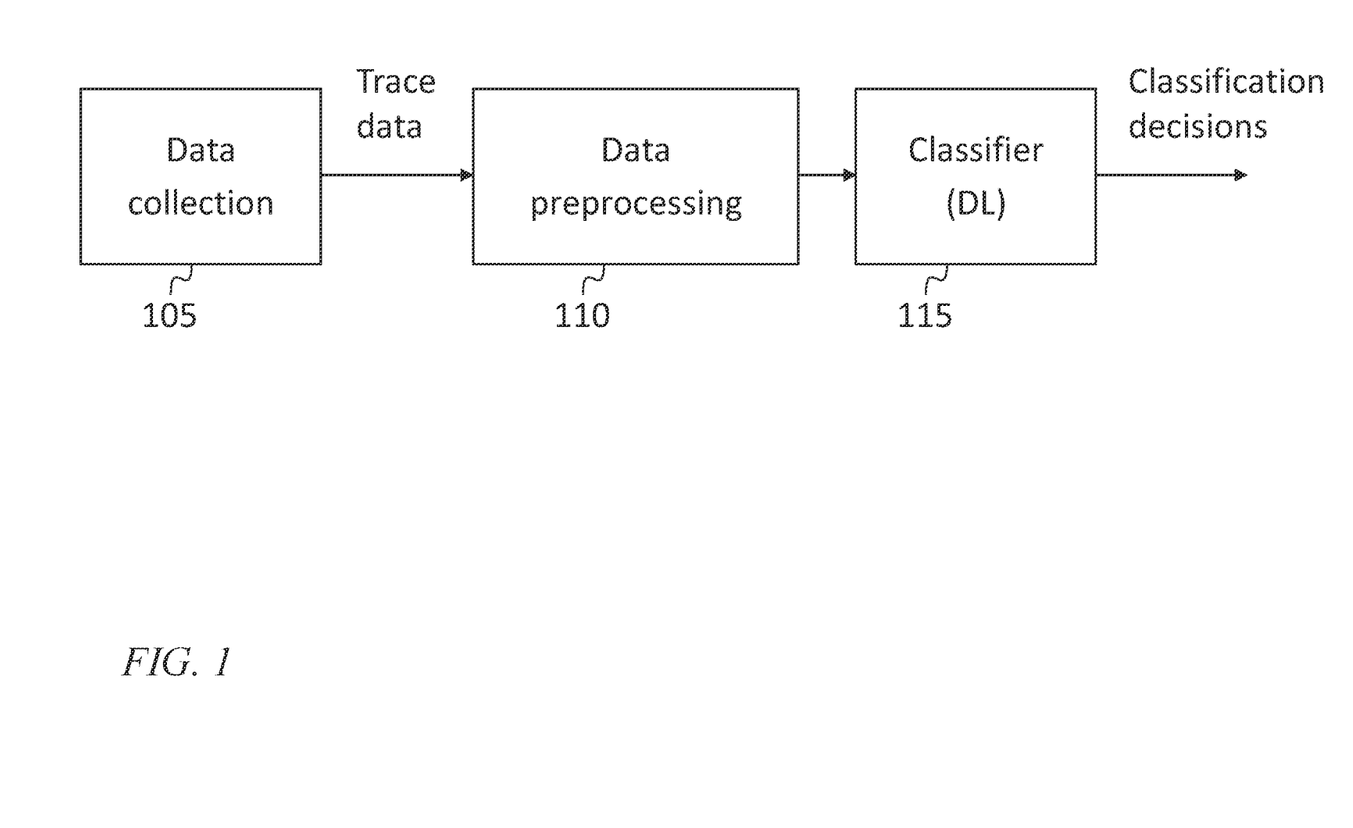
FIG. 1 is a system for classifying parts as faulty or not faulty according to one exemplary embodiment.

FIG. 1 is a system for classifying parts as faulty or not faulty according to one exemplary embodiment. In some embodiments the system includes one or more data collection circuit 105 (which may include, for example, temperature and pressure sensors, amplifiers, and/or analog to digital converters), a data preprocessing circuit 110 (which may reformat the data, as discussed in further detail below), and a classifier engine (which may generate a deep learning (DL) neural network).

The data preprocessing circuit 110 may receive raw trace data (e.g., a number of time traces, as mentioned above) from the data collection circuits 105 and may reformat the data, e.g., into two dimensional arrays (e.g., 224×224 arrays). In one embodiment, the data preprocessing circuit 110 includes one or more data storage devices for storing the raw trace data. The size of the two dimensional arrays may be selected to be comparable to the size of images commonly classified by neural networks. The reformatting may then make it possible to reuse certain portions of the code implementing a neural network classifier of images, for use in some embodiments.

The reformatted input data is provided to the classifier engine 115 for training or making predictions via a DL neural network. In this regard, the classifier engine may be configured with logic or instructions stored on one more tangible, machine-readable media, that may be executed by one or more processing devices for generating, training, and performing predictions via the DL neural network.

Figure 2:
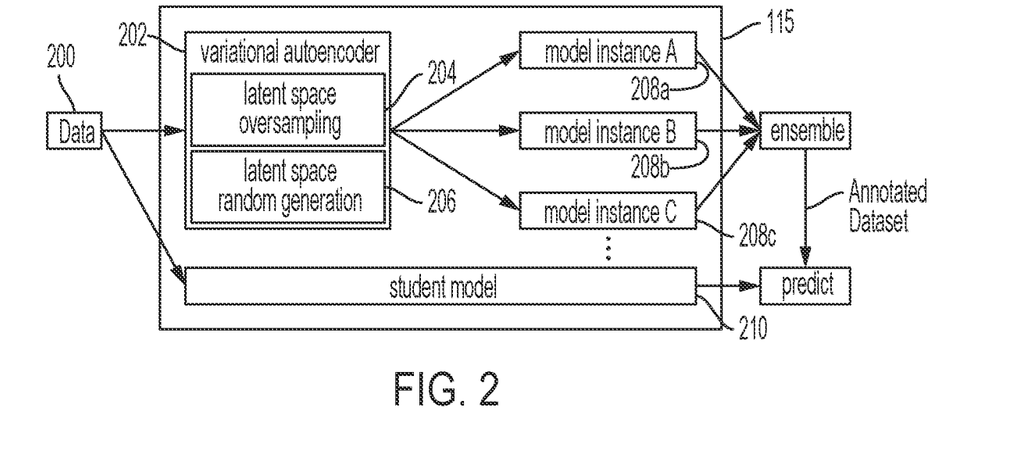
FIG. 2 is a conceptual block diagram of a classifier engine in the system of FIG. 1, according to one exemplary embodiment.

FIG. 2 is a conceptual block diagram of the classifier engine 115 according to one exemplary embodiment. During training, a labeled input dataset 200 is received from the preprocessing circuit 110. The labeled input dataset 200 includes a first number of data samples (e.g., a few thousand data elements) each labelled "good" (or "G"), and a second number of data samples (e.g., between 10 and 100 data elements) each labelled "no good" (or "NG").

The labeled input dataset 200 is used to train a classifier which may be a deep learning neural network such as, for example, a variational autoencoder (VAE) 202. Although a VAE is used as an example, a person of skill in the art should recognize that other deep generative models may be used instead of VAE, such as, for example, a generative adversarial network (GAN), autoregression models, or the like. In the embodiment where the VAE is employed, the VAE is configured to learn a representation of a latent/hidden/manifold space for the input dataset 200. In general terms, the latent space is made up of latent vectors which are simpler/compressed representations (e.g. less dimensions) of the input dataset.

In some embodiments, the trained VAE is invoked for generating additional training data (also referred to as synthetic data samples) in a statistical manner. In this regard, the VAE may be coupled to an oversampling module 204 and a random generation module 206. The oversampling module 204 may be invoked for oversampling the latent space learned by the VAE, to generate additional "no good" samples. The random generation module 206 may be invoked for generating supplemental samples in the latent space 206 using a random input. According to one embodiment, the randomly generated data samples are unlabeled data samples.

In one embodiment, the classifier engine 115 is also configured to create multiple (e.g. two or more) instances 208a-208c (collectively referred to as 208) of a binary baseline classifier. Each classifier instance 208 may be, for example, a neutral network.

The randomly generated data samples from the random generation module 206 are provided to each of the various classifier instances 208 for knowledge distillation. In this regard, an ensemble of predictions from the classifier instances 208 as to the randomly generated data samples are used for training a student classifier/model 210. That is, an aggregate of the predictions by the various classifier instances generate new knowledge which may be distilled and used to train the student classifier 210.

In one embodiment, in addition to the distilled knowledge from the classifier instances 208, the original labeled dataset 200 and/or the additional samples from the oversampling module 204 are used to train the student classifier 210. Once trained, the student classifier 210 may be fed with new trace data obtained for a newly manufactured product, to predict whether the product is "good" or "no good." In one embodiment, the trained student classifier 210 may be used by a detection system (not shown) for making such types of predictions for newly manufactured products. In one embodiment, the detection system may output a message or recommendation on an action to be taken if the product is predicted to be "no good." For example, the action may be to remove the faulty product for further testing, fixing, or discarding. Experiments show that the trained model 210 will work steadily and within a threshold level of classification accuracy (e.g. accuracy of 90% or higher), for new trace data.

Figure 3:
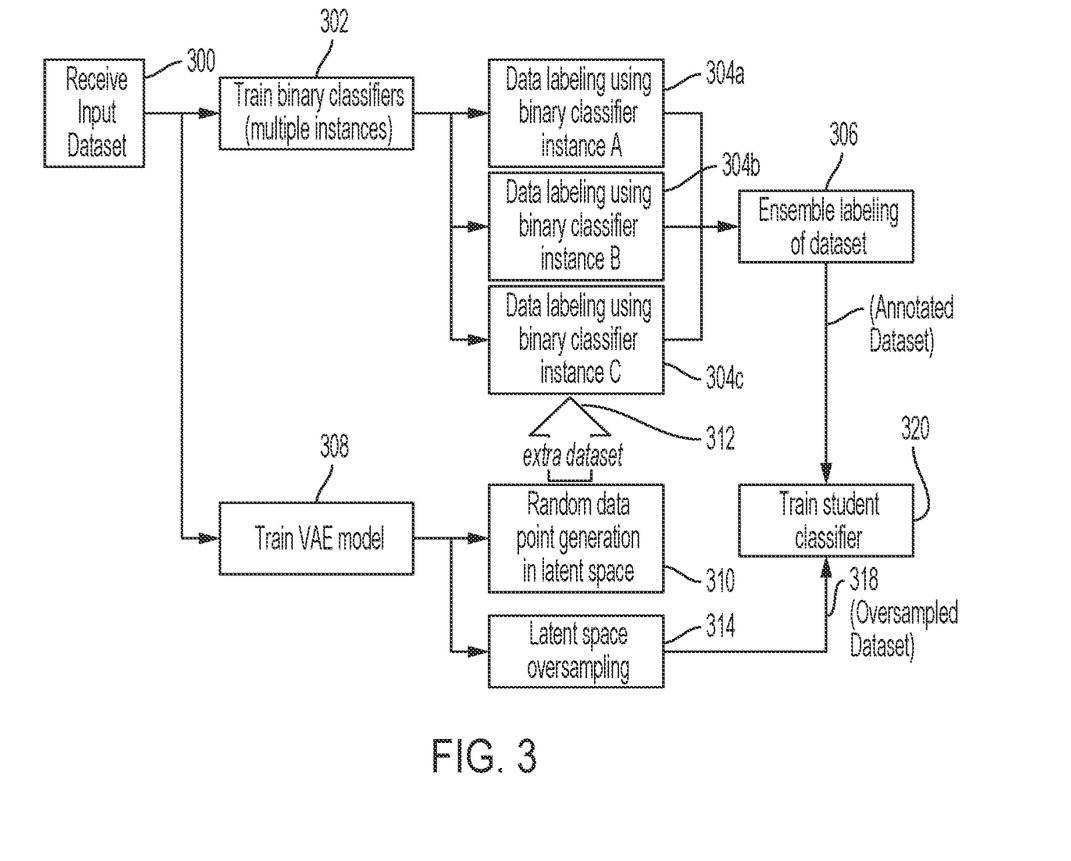
FIG. 3 is a flow diagram of a process executed by the classifier engine of FIG. 2 115 for generating and training a student model according to one exemplary embodiment.

FIG. 3 is a flow diagram of a process executed by the classifier engine 115 for generating and training the student model 210 according to one exemplary embodiment. In block 300, the labeled input dataset 200 is received by the classifier engine.

In block 302, the input dataset is used to train (e.g. using supervised learning) two or more instances 208 of the baseline classifier. Each classifier instance 208 may be generated by initializing the baseline classifier to a random initial state. For example, initial weights of be baseline classifier may be randomly set upon initialization. By training the instances of a single model, as opposed to training separate and independent models that are often large and complex, a more expedient and cost efficient training (in terms of computational resources), may result.

The input dataset received in block 300 is also used to train the VAE 202 in block 308. In one embodiment, the VAE is trained to learn a representation of the input dataset in the latent space. Once trained, the VAE 202 may be used for generating augmented data in blocks 310 and 314. In this regard, in block 310, the classifier engine 115 invokes the trained VAE model to generate extra supplemental unlabeled data samples 312 in the latent space. The extra data samples may be generated using, for example, a random input.

In blocks 304a-304c, each of the classifier instances 208 receive the extra unlabeled data samples 312 and generate a prediction for the received samples.

In block 306, an ensemble of prediction results from the various classifier instances 208 is used for generating annotations for the extra unlabeled data samples 312 and generate an annotated dataset 316. In this manner, knowledge gained by invoking each classifier instance 208 may distilled into the student classifier 210. Considering an aggregate of predictions of the various model instances helps reduce error of the trained student model even if each of the individual model instances, when considered independently, may be prone to errors. Use of an ensemble mechanism may be desirable, therefore, to steadily achieve stability of the trained student model 210.

One of various ensemble methods may be used for generating annotations of the extra unlabeled dataset 312. Such ensemble methods include, but are not limited to, hard voting, soft voting, and knowledge distillation. A hard voting ensemble based method takes the prediction of a majority of the classifier instances 208, and labels the extra dataset based on the majority decision. For example, if classifier instance A 208a and classifier instance B 208b predict a "good" class for a particular data sample, and classifier instance C 208c predicts "no good" class, the data sample is labeled as being in the "good" class.

A soft voting ensemble based method takes the mean of the probabilities of the predictions by the various classifier instances 208 as follows:

$$p(x) = \frac{1}{K}\sum_{i=1}^{K} Pi(x),$$

where K is the number of classifier instances

For example, if classifier instance A 208a predicts "good" with a probability of 99%, classifier instance B 208b predicts "good" with a probability of 49%, and classifier instance C 208c predicts "good" with a probability of 49%, the average probability of the data sample being "good" across the various classifier instances is (99+49+49)/3=65.67%. Thus, the ensemble decision for the data sample is "good."

A knowledge distillation based ensemble method takes the mean probability of multiple instances of the model, taking into account not only the major class (e.g. "good"), but also the minor class (e.g. "no good"). In this regard, mean probabilities of both the major class and the minor class are output as the ensemble decision for the data. In some embodiments, knowledge distillation may be extended to multiple class models. In such embodiments, the mean probabilities may be obtained over the multiple instances of the model over multiple classes.

According to one embodiment, the classifier engine 115 also generates, in block 314, extra data samples for training the student model 210. In this regard, an oversampling algorithm is applied to generate the extra data samples in the minority class (e.g. "no good" class), for producing an oversampled dataset 318. In one embodiment, the oversampling is from the VAE latent space instead of the original or other latent space.

In block 320, the classifier engine 115 trains the student classifier 210 using: i) the original input dataset 200; ii) annotated dataset 316; and/or iii) oversampled dataset 318. The trained student classifier 210 may then be used as a binomial classifier to classify a newly manufactured product as, for example, "good" or "no good," based on new trace data acquired for the product.

Figure 4:
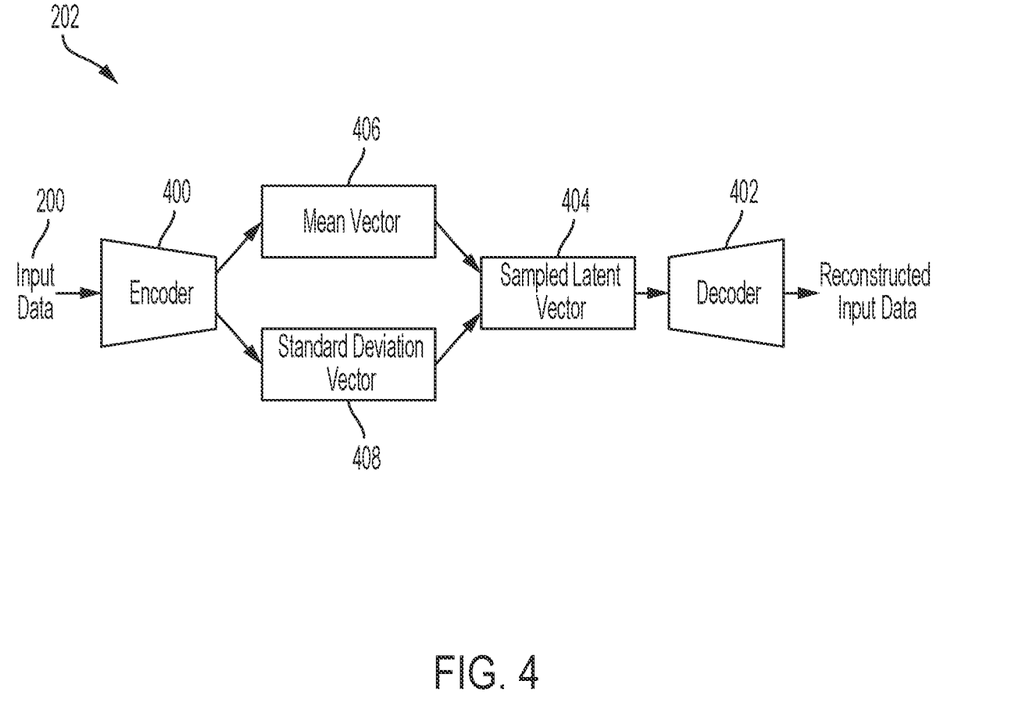
FIG. 4 is a more detailed block diagram of a variational autoencoder in the system of FIG. 1 according to one exemplary embodiment.

FIG. 4 is a more detailed block diagram of the VAE 202 according to one exemplary embodiment. In general terms, the VAE is a neural network that may include an encoder network (simply referred to as an "encoder") 400 and a decoder network (simply referred to as a "decoder") 402. The encoder may map, or encode, each received data element, such as the input data 200, into a latent vector 404, subject to the constraint that the latent vector has a distribution that approximates a unit Gaussian distribution (i.e., that approximates a vector distribution for which the elements of the vector are independent Gaussian distributions, e.g., each having a mean and a variance). In this regard, the VAE employs a mean vector 406 and a standard deviation vector 408 for encoding each received data element into the latent vector 404. As a person of skill in the art should appreciate, the latent vector 404 is a compressed, low-dimensional representation of the input data 200. A space of all latent vectors may be referred to as a latent space.

The decoder 402 may perform an approximate inverse of the operation of the encoder 400; it may map each latent vector 404 produced by the encoder 400 into a (synthetic) data element that approximates the data element the encoder 400 would map into the latent vector 404. The encoder 400 and decoder 402 may be trained together with the input data 200.

Once the encoder 400 and decoder 402 have been trained, block 310 (FIG. 3) may be invoked to generate supplemental data in the latent space. For example, the latent space may be randomly sampled to generate a random vector (generated to have a unit Gaussian distribution), that may be fed into the decoder 402 to generate synthetic data elements (e.g., to generate the extra dataset 312). Since the VAE is trained with data elements from both classes (i.e., with both "good" data elements and "no good" data elements), the extra dataset 312 is unlabeled.

Figure 5:
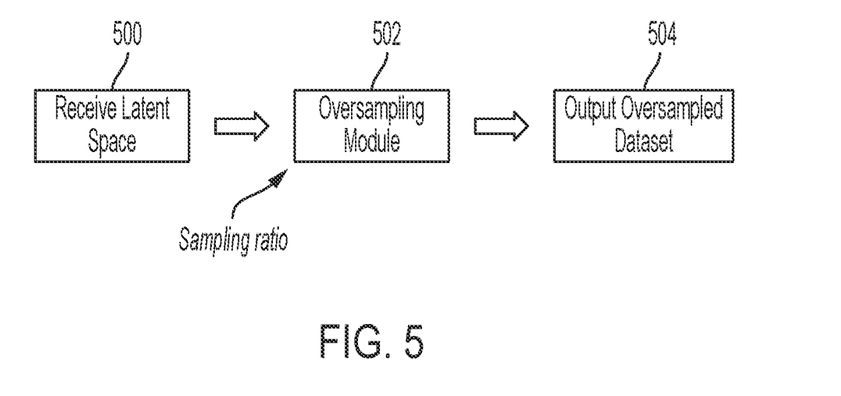
FIG. 5 is a more detailed flow diagram of a process for latent space oversampling according to one exemplary embodiment.

FIG. 5 is a more detailed flow diagram of the process of block 314 (FIG. 3) for latent space oversampling according to one exemplary embodiment. In block 500, the latent space dataset that is obtained by training the VAE model in block 308, is input to an oversampling module 502. In one embodiment, the oversampling module 502 is configured to sample attributes from instances in the minority class ("no good" class) for generating synthetic samples (e.g. the oversampled dataset 318). Unlike traditional oversampling that uses an original input dataset to increase the minority class in the original input dataset, embodiments of the present disclosure allow for increase of the minority class data from the learned latent space.

Oversampling may be achieved using algorithms such as SMOTE (Synthetic Minority Over-sampling Technique), ADASYN (Adaptive Synthetic) oversampling, or the like. In general terms SMOTE is an oversampling method that creates synthetic samples from the minor class instead of creating copies. According to one embodiment, the algorithm selects two or more similar instances (using a distance measure) in the latent space, and perturbs an instance one attribute at a time by a random amount within the difference to the neighboring instances.

ADASYN may offset each of the data elements produced by adding to it a small random vector (or "offset"), to reduce the likelihood that the synthetic samples from the minor class may interfere with the other class (e.g., the majority class, which may be the "good" class).

The oversampled dataset in the latent space is output in block 504.

Figure 6A:
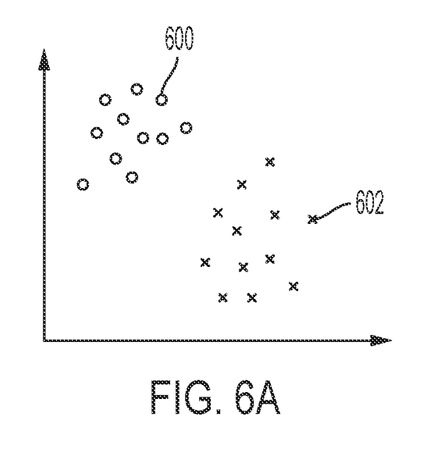
FIG. 6A is a graph of a distribution of an example input dataset that may be used to train a deep learning model.
Figure 6B:
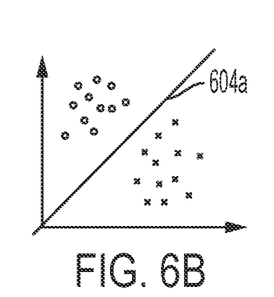
FIGS. 6B-6E are example graphs of multiple classifier instances that produce different decision boundaries based on the input dataset of FIG. 6A.
Figure 6C:
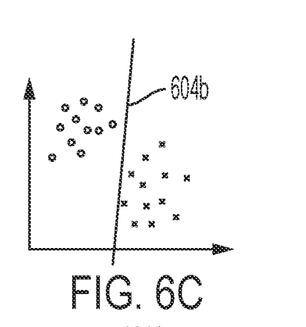
Figure 6D:
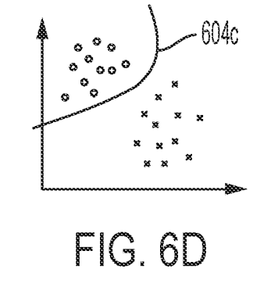
Figure 6E:
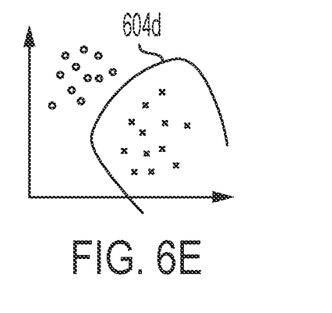

FIG. 6A is a graph of a distribution of an example input dataset (similar to the input dataset 200) that may be used to train a deep learning model. In the example of FIG. 6A, the input dataset is small, and consists of data labeled as "good" 600 and data that is labeled as "no good" 602.

FIGS. 6B-6E are example graphs of multiple classifier instances (e.g. the classifier instances 208) that produce different decision boundaries 604a-604d based on the input dataset of FIG. 6A. The varying decision boundaries are, in one example, the result of the input training data being small. Because of the varying decision boundaries 504a-504d, each of the models are projected to make a different classification decision for future data.

Figure 7A:
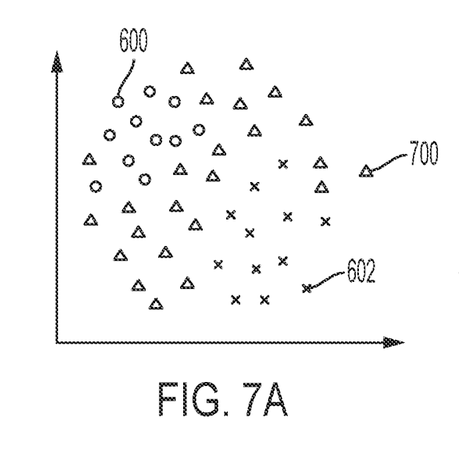
FIG. 7A is a graph of a distribution of an example input dataset that has been augmented with additional samples.

FIG. 7A is a graph of a distribution of an example input dataset (similar to the example dataset of FIG. 6A), that has been augmented with additional training data 700 according to the data augmentation mechanism of the various embodiments of the present disclosure. The additional samples help fill the gap in the input data due to the input dataset being small. The additional samples are generated via the data augmentation mechanisms described above using a deep generative model.

Figure 7B:
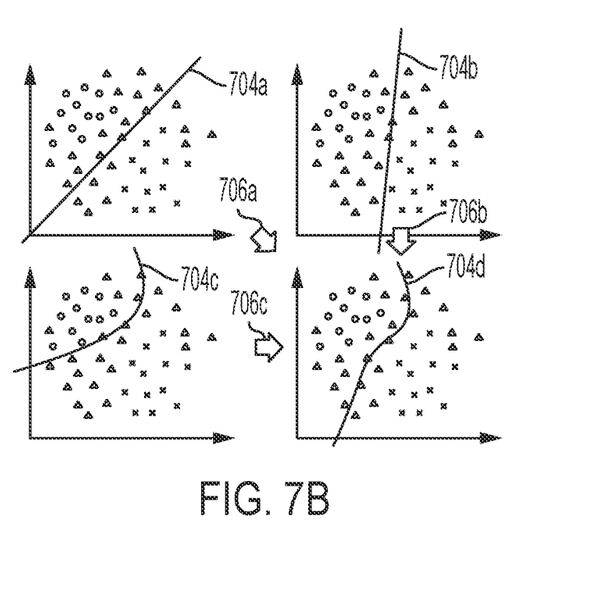
FIG. 7B depicts graphs of multiple classifier instances that produce different decision boundaries based on the augmented training dataset of FIG. 7A.

FIG. 7B depicts graphs of multiple classifier instances (e.g. the classifier instances 208) that produce different decision boundaries 704a-704c based on the augmented training dataset of FIG. 7A. As depicted in FIG. 7B, although the gaps in the input data are filled with the additional samples 700, each of the multiple classifier instances is still prone to producing a different decision boundary 704a-704c. When knowledge distillation from the multiple classifier instances is applied, however, as denoted via arrows 706a-706c, a new decision boundary 704d may be identified for the student classifier that is more stable and accurate than each of the individual model instances.

Experiment shows that by applying knowledge distillation from the model instances, a generalized ML model may be generated steadily and stably, without knowing the full test dataset. For example, the validation accuracy for some of the individual model instances for the "no good" data is as low as 80%. However, the generalized ML model generated with the data augmentation and knowledge distillation mechanism of the embodiments of the present disclosure, generates a validation accuracy of 90% or higher for the "no good" data.

In some embodiments, one or more of the data preprocessing circuit 110, the classifier engine 115, and the various modules and models/classifiers discussed above, is implemented in one or more processing circuits. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for knowledge distillation for model instances have been specifically described and illustrated herein, many modifications and variations will be apparent to those skilled in the art. Accordingly, it is to be understood that a system and method for knowledge distillation constructed according to principles of this disclosure may be embodied other than as specifically described herein. The disclosure is also defined in the following claims, and equivalents thereof.

What is claimed is:

1. A method comprising:
receiving, by a processor, an input dataset;
generating, by the processor, at least first and second instances of a first classifier, wherein the first instance of the first classifier is initialized to a first state, and the second instance of the first classifier is initialized to a second state different from the first state;
training, by the processor, the first and second instances of the first classifier based on the input dataset;
training, by the processor, a second classifier based on the input dataset, wherein the second classifier is configured to learn a representation of the input dataset in a latent space;
invoking, by the processor, the second classifier for generating a first supplemental dataset in the latent space;
generating, by the processor, a first prediction for labeling the first supplemental dataset based on the first instance of the first classifier;
generating, by the processor, a second prediction for labeling the first supplemental dataset based on the second instance of the first classifier;
generating, by the processor, annotations for the first supplemental dataset based on the first prediction and the second prediction, and outputting an annotated first supplemental dataset; and
training, by the processor, a third classifier based on at least the input dataset and the annotated first supplemental dataset.

2. The method of claim 1, wherein each of the first, second, and third classifiers is a neural network.

3. The method of claim 2, wherein the second classifier is a variational autoencoder.

4. The method of claim 1, wherein the latent space provides a compressed representation of the input dataset.

5. The method of claim 1, wherein the generating of the first supplemental dataset includes generating random data elements in the latent space.

6. The method of claim 1, wherein the generating of the annotations includes:
determining a major class based on the first prediction and the second prediction; and
labeling the first supplemental dataset based on the major class.

7. The method of claim 1, wherein the generating of the annotations includes:
determining a first probability of the first prediction and a second probability of the second prediction;
computing an average of the first probability and the second probability; and
identifying a class for the first supplemental dataset based on the average.

8. The method of claim 1, wherein the generating of the annotations includes:
determining, based on the first prediction, a first probability of a major class and a second probability of a minor class;
determining, based on the second prediction, a third probability of the major class and a fourth probability of the minor class;
computing a first average of the first probably and the third probability;
computing a second average of the second probability and the fourth probability; and
labeling the first supplemental dataset based on the first average and the second average.

9. The method of claim 1 further comprising:
generating a second supplemental dataset based on oversampling the latent space; and
training the third classifier based on the input dataset, the annotated first supplemental dataset, and the second supplemental dataset.

10. A system comprising:
processor; and
memory, wherein the memory has stored therein instructions that, when executed by the processor, cause the processor to:
receive an input dataset;
generate at least first and second instances of a first classifier, wherein the first instance of the first classifier is initialized to a first state, and the second instance of the first classifier is initialized to a second state different from the first state;
train the first and second instances of the first classifier based on the input dataset;
train a second classifier based on the input dataset, wherein the second classifier is configured to learn a representation of the input dataset in a latent space;
invoke the second classifier for generating a first supplemental dataset in the latent space;
generate a first prediction for labeling the first supplemental dataset based on the first instance of the first classifier;
generate a second prediction for labeling the first supplemental dataset based on the second instance of the first classifier;

generate annotations for the first supplemental dataset based on the first prediction and the second prediction, and output an annotated first supplemental dataset; and train a third classifier based on at least the input dataset and the annotated first supplemental dataset.

11. The system of claim 10, wherein each of the first, second, and third classifiers is a neural network.

12. The system of claim 11, wherein the second classifier is a variational autoencoder.

13. The system of claim 10, wherein the latent space provides a compressed representation of the input dataset.

14. The system of claim 10, wherein the instructions that cause the processor to generate the first supplemental dataset include instructions that cause the processor to generate random data elements in the latent space.

15. The system of claim 10, wherein the instructions that cause the processor to generate the annotations include instructions that cause the processor to:
    determine a major class based on the first prediction and the second prediction; and
    label the first supplemental dataset based on the major class.

16. The system of claim 10, wherein the instructions that cause the processor to generate the annotations include instructions that cause the processor to:
    determine a first probability of the first prediction and a second probability of the second prediction;
    compute an average of the first probability and the second probability; and
    identify a class for the first supplemental dataset based on the average.

17. The system of claim 10, wherein the instructions that cause the processor to generate the annotations include instructions that cause the processor to:
    determine, based on the first prediction, a first probability of a major class and a second probability of a minor class;
    determine, based on the second prediction, a third probability of the major class and a fourth probability of the minor class;
    compute a first average of the first probability and the third probability;
    compute a second average of the second probability and the fourth probability; and
    label the first supplemental dataset based on the first average and the second average.

18. The system of claim 10, wherein the instructions further cause the processor to:
    generate a second supplemental dataset based on oversampling the latent space; and
    train the third classifier based on the input dataset, the annotated first supplemental dataset, and the second supplemental dataset.

19. A system for classifying manufactured parts as good or defective, the system comprising:
    a data collection circuit configured to collect an input dataset; and
    a processing circuit coupled to the data collection circuit, the processing circuit having logic for:
    receiving the input dataset;
    generating at least first and second instances of a first classifier, wherein the first instance of the first classifier is initialized to a first state, and the second instance of the first classifier is initialized to a second state different from the first state;
    training the first and second instances of the first classifier based on the input dataset;
    training a second classifier based on the input dataset, wherein the second classifier is configured to learn a representation of the input dataset in a latent space;
    invoking the second classifier for generating a first supplemental dataset in the latent space;
    generating a first prediction for labeling the first supplemental dataset based on the first instance of the first classifier;
    generating a second prediction for labeling the first supplemental dataset based on the second instance of the first classifier;
    generating annotations for the first supplemental dataset based on the first prediction and the second prediction, and outputting an annotated first supplemental dataset; and
    training a third classifier based on at least the input dataset and the annotated first supplemental dataset.

20. The system of claim 19, wherein the processing circuit having logic for generating the annotations include the processing circuit having logic for:
    determining a major class based on the first prediction and the second prediction; and
    labeling the first supplemental dataset based on the major class.

* * * * *